Feb. 11, 1969 A. G. NESHER 3,426,512
VENTILATION DEVICE FOR PRODUCING LAMINAR FLOW
Filed June 28, 1967 Sheet 1 of 5
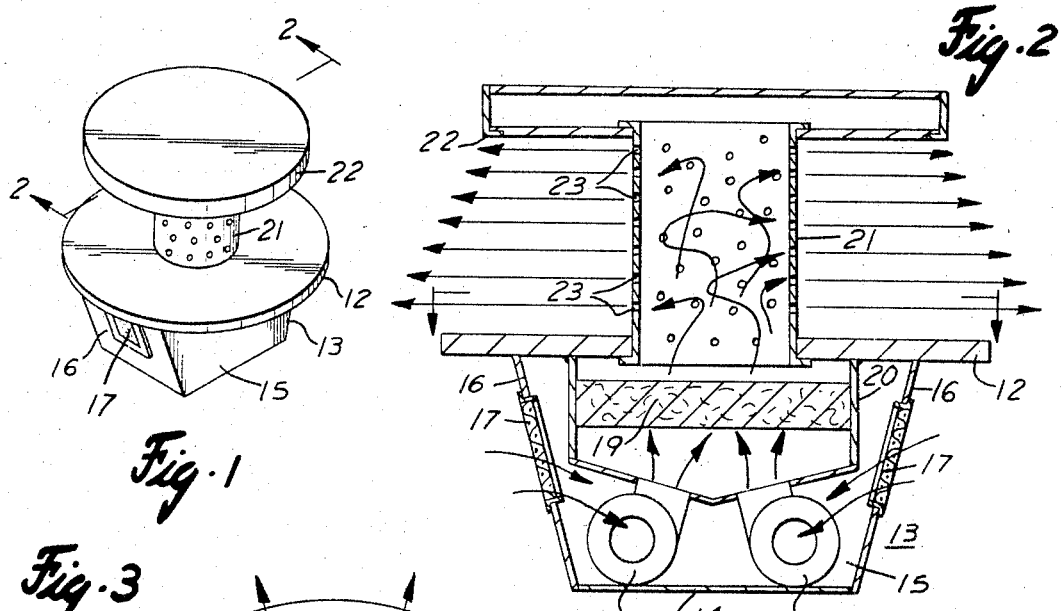
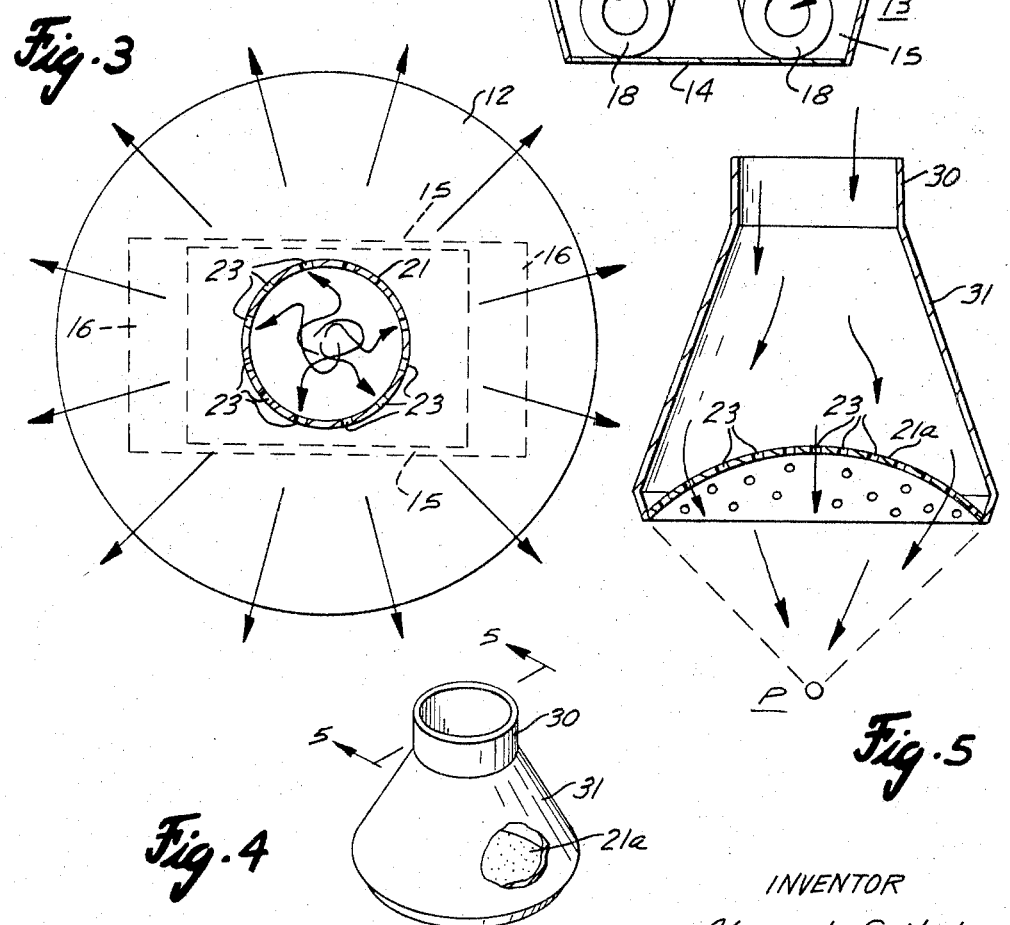
INVENTOR
Alexander G. Nesher
BY
ATTORNEY

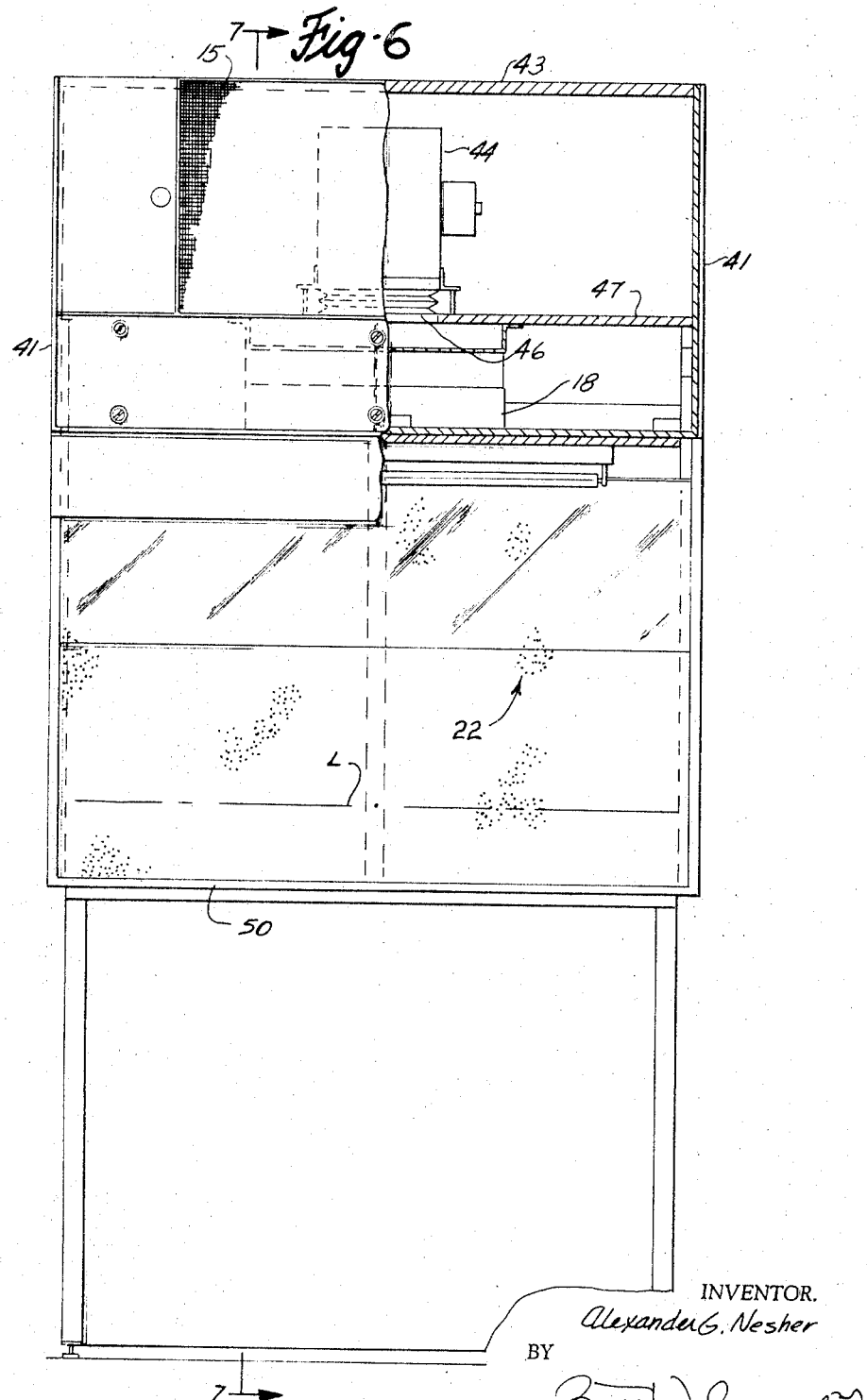

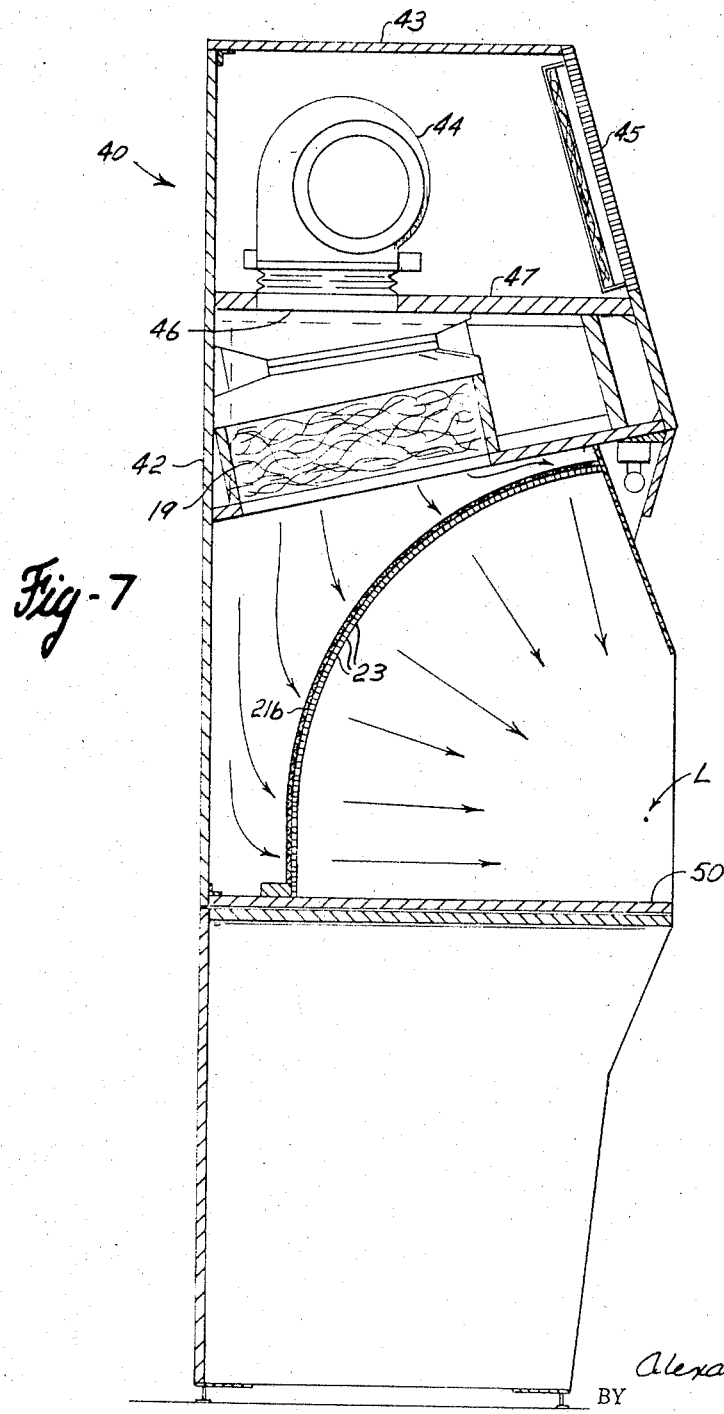

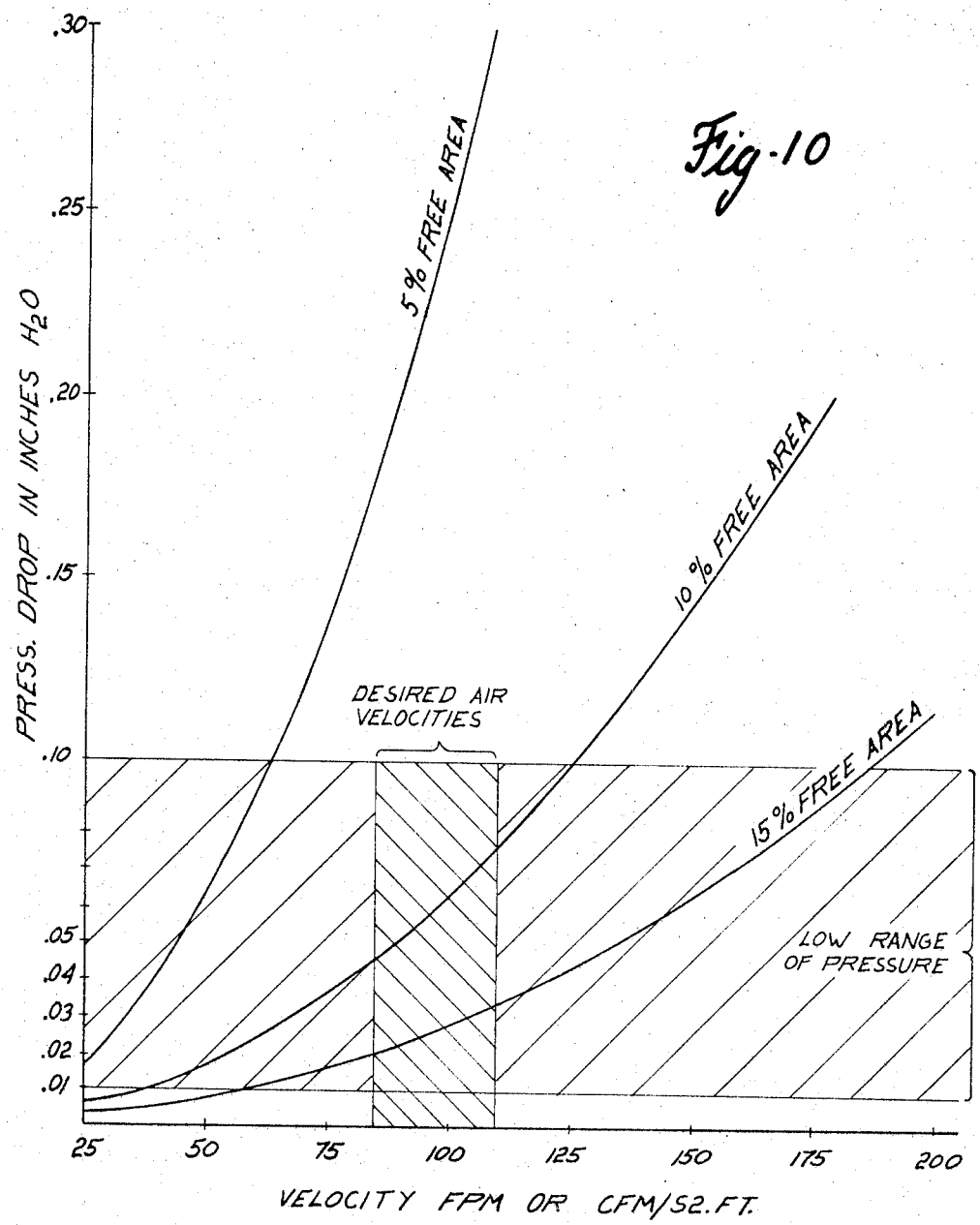

United States Patent Office 3,426,512
Patented Feb. 11, 1969

3,426,512
VENTILATION DEVICE FOR PRODUCING
LAMINAR FLOW
Alexander G. Nesher, 210 Fitzwilliam Lane,
Rosemont, Pa. 19010
Continuation-in-part of application Ser. No. 534,750,
Mar. 16, 1966. This application June 28, 1967, Ser.
No. 649,663
U.S. Cl. 55—410            9 Claims
Int. Cl. B01d 46/00; F24f 7/00

ABSTRACT OF THE DISCLOSURE

This invention relates to a ventilation device for producing a controlled velocity laminar flow of clean air over a work bench or other work area. The laminar flow is produced by a curved perforated membrane which either converges or diverges the air flow in relationship to the work area.

Cross-reference to related application

This application is a continuation in part of my prior application filed Mar. 16, 1966, Ser. No. 534,750 now abandoned.

BACKGROUND OF THE INVENTION

Field of the invention

This invention relates to laminar flow control apparatus and more particularly to such apparatus for directing or focusing laminar flow streams.

Background of the prior art

It has previously been discovered that the use of air in a laminar flow state is effective for retaining and maintaining a clean location. This is due to the fact that the extremely regular flow pattern of such air uniformly sweeps the surfaces of equipment and personnel in its path and carries the contaminates away from the work area. In view of this discovery, and because of the recent development of relatively simple means for developing such laminar flow air streams, the use of such equipment for controlling contamination has become widespread in electronics, space, pharmaceutical and other industries, and environments where extremely high standards of cleanliness are required.

With laminar air flow, the flow of the entire body of air within a confined area moves with uniform velocity along parallel flow lines, whereby the laminar airflow characteristics predominate throughout the entire space, with a minimum of eddies. The detailed requirements for such laminar airflow and its utilization are set forth in Federal Standard No. 209, "Clean Room and Work Station Requirements, Controlled Environment Revised."

In prior Patent No. 3,303,771, there is shown a ventilated ceiling construction employing a flat diffuser panel with which a laminar airflow is established for vertical flow.

It has also been proposed to provide horizontal air flow from a flat diffuser panel.

The constructions heretofore available had shortcomings. Although prior techniques for producing laminar flow have been very effective, it has been observed that obstructions such as microscopes and other equipment which are placed at a work station in the path of the stream of fluid will disturb the laminar flow pattern, creating turbulence and back drafts. Such disturbances considerably reduce the efficiency of the laminar stream of air in removing contaminates.

Various attempts to reduce the disturbances created by such equipment have been made, including the use of air deflectors, baffles and air straightening enclosures. Although these arrangements somewhat reduce turbulence, they fall far short of a satisfactory solution to the problem.

I have discovered that it is advantageous to direct clean air through a laminar flow producing device which is curved, like a lens, to create converging or diverging flow of air, as required. In the case of converging flow, objectionable turbulence around obstructions is substantially eliminated no matter what the size or shape of the obstruction. In the case of diverging flow advantages are obtained particularly where flow space is limited and operator comfort is to be considered. An extended range of design flexibility is thus obtained, particularly for unitary clean air equipment, and this is not subject to the shortcomings of the straight laminar flow heretofore employed.

It is the principal object of the present invention to provide laminar flow producing devices for air and other gases in which the air in laminar flow paths is converged or diverged to provide freedom from turbulence with relatively high fluid velocity.

It is a further object of the present invention to provide, with laminar gas flow devices, a controlled pattern of delivery from a curved delivery element in which the curvature is determined by the requirements of the particular application.

It is a further object of the present invention to provide, with laminar gas flow devices for clean gas flow, a focusing plate which can be separated from the filter which is used to clean the air.

It is a further object of the present invention to provide a laminar gas flow device which can utilize a simple but effective element for producing the laminar flow effect and directing the gas in a selected or focused pattern.

It is a further object of the present invention to provide laminar gas flow apparatus with diverging gas flow.

It is a further object of the present invention to provide laminar gas flow apparatus with a spherical delivery device.

It is a further object of the present invention to provide laminar gas flow apparatus with converging gas flow.

An important object of my invention, also, is the provision of techniques and apparatus for eliminating the turbulence around objects placed in the path of a stream of air in a laminar flow state.

Other objects and advantageous features of the invention will be apparent from the description and claims.

Brief description of the drawing

The nature and characteristic features of the invention will be more readily understood from the following description taken in connection with the accompanying drawings forming part thereof, in which:

FIGURE 1 is a view in perspective of laminar gas flow apparatus in accordance with the invention in which the laminar gas flow producing device is cylindrical and the laminar gas flow is divergent;

FIG. 2 is a transverse vertical sectional view, on a larger scale, taken approximately on the line 2—2 of FIG. 1;

FIG. 3 is a horizontal sectional view taken approximately on the line 3—3 of FIG. 3.

FIG. 4 is a view in perspective of laminar gas flow apparatus in accordance with the invention in which the laminar flow producing device is spheroidal in shape and laminar flow is convergent toward a point;

FIG. 5 is a transverse vertical sectional view taken approximately on the line 5—5 of FIG. 4;

FIG. 6 is a front view of laminar gas flow apparatus in accordance with the invention in which the laminar gas flow producing device is concave and the laminar flow is convergent toward a horizontal focal line;

FIG. 7 is a vertical sectional view taken approximately on the line 7—7 of FIG. 6;

FIG. 10 is a graph illustrating certain performance characteristics of laminar flow producing devices in accordance with the invention.

Figure 8:
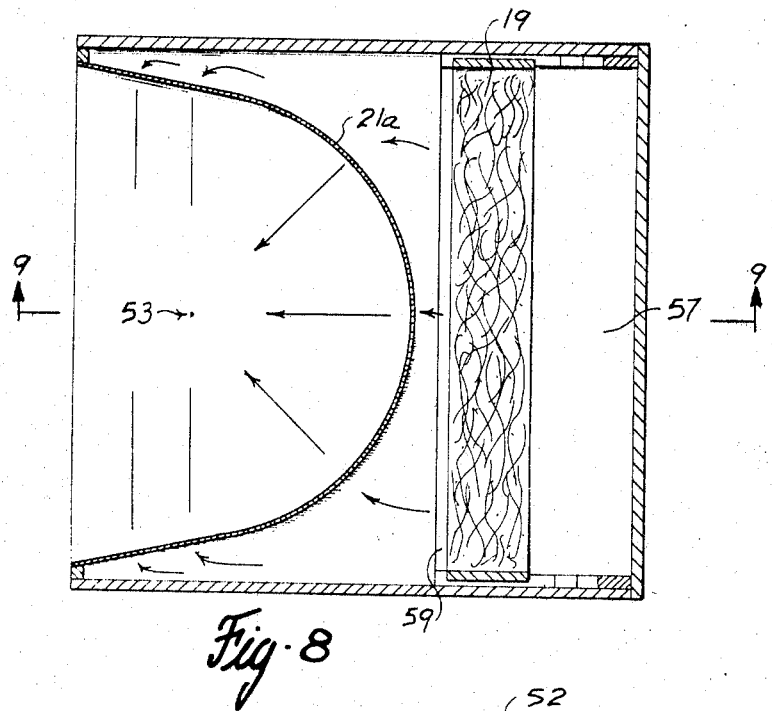
FIG. 8 is a horizontal sectional view of another laminar gas flow apparatus in accordance with the invention in which the laminar gas flow device is concave and in which the laminar gas flow is convergent toward a vertical focal line.

It should, of course, be understood that the description and drawings herein are illustrative merely, and that various modifications and changes can be made in the structure disclosed without departing from the spirit of the invention.

Like numerals refer to like parts throughout the several views.

Description of the preferred embodiments

Referring first to FIG. 10, in the graph there shown the characteristics of perforate membranes are shown with pressure drop in inches of water as ordinates, velocity in feet per minute or cubic feet per minute per square foot as abscissas, and with curves showing various free area values of the membrane.

Plots of pressure drop versus velocity with plates having five, ten and fifteen percent of their total area as free or open area consisting of apertures are shown in FIG. 10.

Referring now to FIGS. 1, 2 and 3 of the drawings, a structure is shown in which contaminate free air delivery in a laminar flow condition is made to diverge at a circular work location or station around which a plurality of operators may be placed.

A horizontal table 12 is shown, mounted on a supporting housing 13 having a bottom wall 14 and side walls 15 and 16. The side walls 16 have air inlet openings 17 and a plurality of blowers 18, with which the openings 17 are in communication, deliver air through a filter 19 mounted in a filter housing 20.

The filter 19, preferably of the sub-micron type, should be of the so-called "absolute" type and comprises a fiber glass medium mounted in a pleated package having corrugated separators between the pleats. Such filters are well known in the art and typically have a filtering ability such that 99.97 percent of all particles above one-third micron in size are removed from the air stream passing through them. Thus, a substantially contaminant free source of air is provided by the blower 18 and the filter 19.

The interior of the filter housing 20 is in communication with a perforated membrane 21, cylindrical in shape and on which a shield 22 parallel to the table 12 is carried.

The perforated membrane 21, preferably in sheet or plate form and which may be of any suitable material, including plastic, or sheet metal, made for example, of anodized aluminum, is located in the path of air from the absolute filter 19. The perforated membrane 21 is provided with a multiplicity of apertures 23 covering substantially its entire surface area. The apertures 23 function as nozzles establishing a multiplicity of lines of laminar flow for the air or other gas. In general, I have found that the shape and dimensioning of the apertures is not particularly critical so long as they are passed through the membrane in a plane normal to the surface thereof and so long as they are substantially smooth and free from burrs and other irregularities.

The diameters of the apertures 23 must not be larger than the thickness or gage of the plate to provide the desired laminar flow.

For most effective results, I have found that the percent of free area of the apertures 23 in the membrane 21 should comprise from about five to fifteen percent of the total surface area of the membrane 21 when operating within these limits, while maintaining a minimum pressure drop across the membrane or plate of from about 0.01 inch of $H_2O$ to 0.10 inch of $H_2O$, with velocities of 25 to 200 feet per minute. (See FIG. 10.) If higher velocities or higher plenum pressures are required static pressure may be increased, say up to 0.35 inch of $H_2O$.

Merely by way of example, one sixteenth inch holes on five thirty-seconds inch staggered centers would give an open area of 21.8 square inches per square foot or 15%.

If, in the embodiment of the invention shown in FIGS. 1, 2 and 3, the exit velocity of air in laminar flow state, is of the order of 200 feet per minute, the velocity at the location of the workers may be of the order of 60 feet per minute, thereby providing a comfortable environment.

Referring now to FIGS. 4 and 5, a cylindrical duct 30 is provided to which clean air under pressure is supplied from any suitable source and passes through a filter, such as the filter 19. The duct 30 has connected thereto a frusto conical housing 31 with a perforated membrane or plate 21a with apertures 23 therein, as previously described, to provide a laminar air flow. The plate 21a is shown as spheroidal with a point focus at P toward which the air from the apertures 23 is directed. Since the volume increases toward the focal point P a lower velocity may be employed at the source to attain the desired delivery rate.

Referring now to FIGS. 6 and 7, an embodiment of the invention is shown in which contaminate free air is made to converge on a localized work area or work station along a line generally indicated by the letter L. While the terms "work station" and "work area" are used herein, it should be understood that the invention is useful in sweeping any localized area with air in a laminar flow condition and these terms are intended to cover any such area, which could be, for example, a hospital operating table, a laboratory work bench, or an industrial work area, at which intricate and delicate mechanical or electrical components are assembled.

The unit shown in FIGS. 6 and 7 is mounted in a substantially rectangular cabinet 40, including side walls 41, a rear wall 42 and a top 43. A blower 44 is mounted in the upper portion of the unit. An air intake for the blower including a relatively coarse filter 45 is mounted at the top of the cabinet 40 in the front. The blower 44 is mounted so as to draw in air from the ambient atmosphere and to direct a downwardly flowing stream through an opening 46 in a partition 47 spaced from the top of the cabinet.

A filter 18 is provided, as before. The cabinet 40 is provided with a counter 50 spaced somewhat below the filter 19, preferably at about waist-high level.

A perforated plate or membrane 21b is provided located in the path of air intermediate the counter 50 and the absolute filter 19. The membrane or plate 21b illustrated in the embodiment of the invention disclosed in FIGS. 6 and 7 is arcuate in cross section and extends substantially along the entire length of the counter 50, thereby forming a parti-cylindrical surface. As may be seen in FIG. 7, the concave side of the membrane 21b faces the counter 50, whereas the convex surface is exposed to the air which passed through the absolute filter 19.

The parti-cylindrical membrane 21b is provided with a multiplicity of apertures 23 covering substantially its entire surface area, and of a size and spacing as previously referred to.

Figure 9:
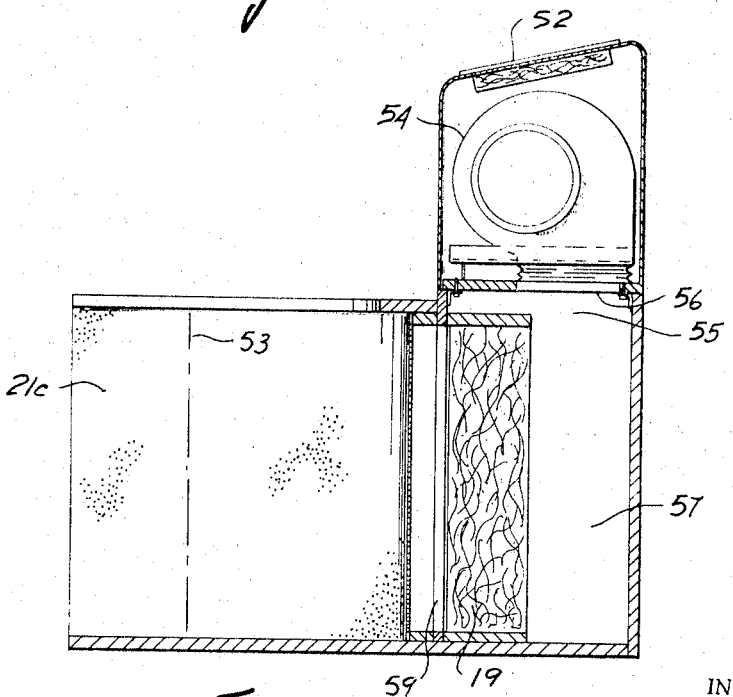
FIG. 9 is a vertical sectional view taken approximately on the line 9—9 of FIG. 8.

Referring now to FIGS. 8 and 9, an embodiment of the invention is shown in which the focusing plate or membrane 21c extends in a substantially 180° arc about a work station whose center is at the line 53.

According to this embodiment of the invention, a blower 54 is mounted at the upper portion of a cabinet 55. The blower 54 is provided with an air intake 52 and an outlet 56 and directs air downwardly into a chamber 57. An absolute filter 19 of the general type described above, is mounted in an opening in a side wall 59 of the chamber 57.

The perforate membrane 21c is spaced from the outlet of the absolute filter 19 so that contaminate free air is directed substantially over the entire convex side of the membrane. The same values for area of the apertures with respect to the total area of the membrane, the minimum pressures and velocity ranges described above with respect to the 90° parti-cylindrical plate apply to the embodiment of FIGS. 6 and 7. Using the 180° shape, air streams in laminar flow patterns are caused to converge on the localized work area immediately surrounding the line 53.

It should be understood that the membrane might also be spherically or parti-spherically shaped and that the use of other curved sections for focusing the flow on a line or point are intended to be within the scope of the invention.

Moreover, it will be apparent to those skilled in the art that the place of convergence with respect to a work surface can be varied by raising or lowering the membrane or even by changing the radius of curvature. While a unit could be used in which these values were adjustable, for most purposes a more or less permanently installed membrane will be sufficient.

It will be apparent from the foregoing description of the illustrative embodiments of the invention that a most simple, unique and efficient means of directing air to a work area by eliminating air flow disturbances around an obstruction placed in the path of such flow has been provided.

Apparatus formed in accordance with the principles of my invention is highly reliable and most effective in maintaining clean work areas, substantially eliminating the problems of turbulence encountered with prior equipment and permitting of a wide range of adjustment, of direction of laminar air flow converging or diverging, as desired, to suit particular operating conditions.

I claim:
1. Apparatus for controlling delivery of clean gas to a clean environment structure comprising
  a housing member,
  a contaminant free source of gas under pressure including a filter member connected to said housing member,
  a work location,
  means carried by said housing member receiving the gas from said source and establishing a multiplicity of contiguous lines of laminar gas flow comprising a membrane having opposite substantially equally spaced faces,
  said membrane having a multiplicity of laminar flow producing openings therethrough connecting said faces,
  said membrane being contiguous to said work location and curved in shape to position said openings to direct the laminar gas flow from said openings to said work location.
2. Apparatus according to claim 1 in which
  said membrane is a metallic plate.
3. Apparatus according to claim 1 in which
  said membrane has at least a portion thereof cylindrical in shape.
4. Apparatus according to claim 1 in which
  said membrane is convexed on the delivery side thereof.
5. Apparatus according to claim 1 in which
  said membrane is concaved on the delivery side thereof.
6. Apparatus according to claim 1 in which
  said membrane is hollow spheroidal in shape on the delivery side thereof.
7. Apparatus according to claim 1 in which
  the free area of the apertures in said membrane is in the range from about 5 to 15 percent of the effective area of the membrane.
8. Apparatus according to claim 5 in which
  the curvature of said membrane has a focal line toward which said gas is converged.
9. Apparatus according to claim 6 in which
  the curvature of said membrane has a focal point toward which said gas is converged.

References Cited

UNITED STATES PATENTS

| | | | |
|---|---|---|---|
| 832,247 | 10/1906 | Edwards | 98—40 |
| 2,251,660 | 8/1941 | Chipley | 98—40 X |
| 2,291,220 | 7/1942 | Germonprez | 98—33 |
| 2,395,233 | 2/1946 | Richardson | 98—40 |
| 3,303,771 | 2/1967 | Nesher et al. | 98—115 X |
| 3,356,006 | 12/1967 | Scott | 98—33 |
| 3,318,076 | 5/1967 | Baker | 98—115 |
| 3,363,532 | 1/1968 | Horneff | 98—33 |

OTHER REFERENCES

Microvoid 90° Converging Laminar Flow Work Station; Air Control Inc., March 1966.

ROBERT A. O'LEARY, *Primary Examiner.*

WILLIAM E. WAYNER, *Assistant Examiner.*

U.S. Cl. X.R.

55—467; 98—40, 115